(12) United States Patent
Zimmerman et al.

(10) Patent No.: US 10,311,573 B2
(45) Date of Patent: Jun. 4, 2019

(54) TRAINING AND MACHINE LEARNING CLASSIFICATION OF MOLD IN DIGITAL MICROSCOPY IMAGES

(71) Applicant: TechCyte, Inc., Orem, UT (US)

(72) Inventors: S. Russell Zimmerman, Orem, UT (US); Ralph Yarro, III, Orem, UT (US); Benjamin P. Cahoon, Orem, UT (US); Richard Boyd Smith, Orem, UT (US); Hyrum S. Anderson, Orem, UT (US)

(73) Assignee: Techcyte, Inc., Orem, UT (US)

( * ) Notice: Subject to any disclaimer, the term of this patent is extended or adjusted under 35 U.S.C. 154(b) by 3 days.

(21) Appl. No.: 15/585,039

(22) Filed: May 2, 2017

(65) Prior Publication Data

US 2018/0322634 A1 Nov. 8, 2018

(51) Int. Cl.
*G06T 7/00* (2017.01)
*G06T 7/11* (2017.01)
*G06K 9/62* (2006.01)

(52) U.S. Cl.
CPC .............. *G06T 7/11* (2017.01); *G06K 9/6267* (2013.01); *G06T 2207/10056* (2013.01); *G06T 2207/20081* (2013.01)

(58) Field of Classification Search
CPC ............. G06T 7/11; G06T 2207/10056; G06T 2207/20081; G06K 9/6267
USPC ........................................................ 382/159
See application file for complete search history.

(56) References Cited

U.S. PATENT DOCUMENTS

| | | | |
|---|---|---|---|
| 2013/0109051 A1* | 5/2013 | Li | C12M 41/46 435/34 |
| 2014/0185906 A1* | 7/2014 | Ding | G01N 33/49 382/134 |
| 2014/0235474 A1* | 8/2014 | Tang | G06F 19/18 506/9 |
| 2015/0310088 A1* | 10/2015 | Burge | G06F 17/30991 707/740 |

\* cited by examiner

*Primary Examiner* — Ping Y Hsieh
(74) *Attorney, Agent, or Firm* — TechLaw Ventures, PLLC; Terrence J. Edwards

(57) ABSTRACT

Systems, methods, and devices for classifying or detecting mold samples or training computer models (such as neural networks), are disclosed. A method includes obtaining a microscopy image of a mold sample. The method includes determining a classification of the mold sample based on non-image data corresponding to the mold sample. The method further includes training a computer model based on the microscopy image and a label indicating the classification.

15 Claims, 8 Drawing Sheets

TRAINING AND MACHINE LEARNING CLASSIFICATION OF MOLD IN DIGITAL MICROSCOPY IMAGES

TECHNICAL FIELD

The present disclosure relates to systems and methods for identifying particles and more particularly relates to systems and methods for imaging and machine learning classification or detection of mold.

DETAILED DESCRIPTION

Figure 1:
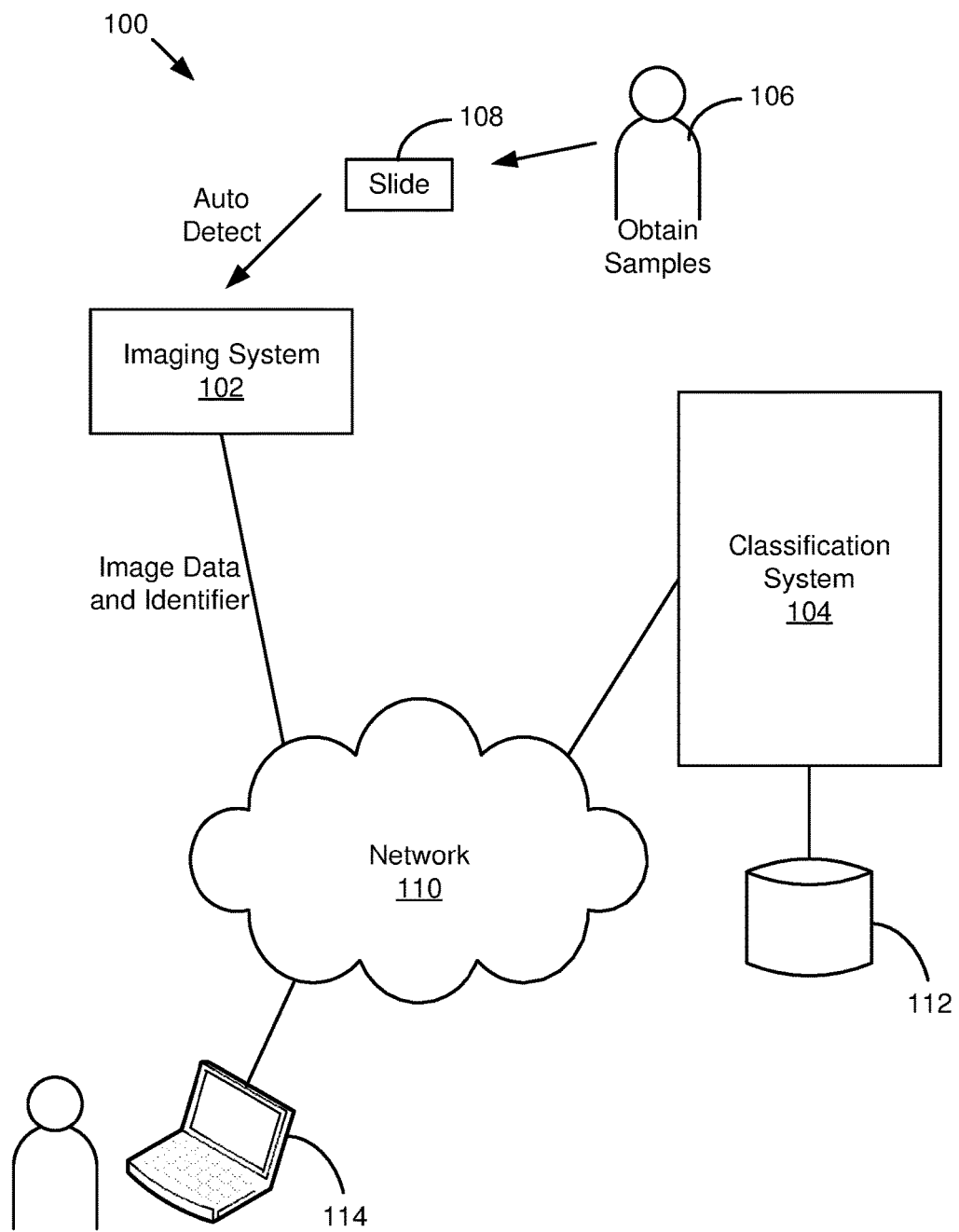
FIG. 1 illustrates a schematic diagram of a system for imaging and machine learning classification or detection of particulates or materials in accordance with the teachings and principles of the disclosure.

The present application discloses systems, methods, and devices for mold classification and/or for training machine learning algorithms or models. Systems and methods for generation of training data are also disclosed. Information about the mold or other particles present in a location or environment may be of great interest for research, medical, or other purposes. For example, mold spores in a living environment can lead to respiratory or other medical problems for residents in addition to damage to buildings or structures.

According to one embodiment, samples of mold or materials may be obtained and placed on a sample slide. Sample slides may include slides on which a sample material can be placed for review and imaging. For example, a sample may include particulates that were suspended or located in air, liquid, soil, body or plant tissue, or on a surface in a building, furniture, appliance or other location. The sample slide may include a transparent slide that may be used to protect and/or view the mold particulates captured in the sample. For example, a technician or user may obtain a sample and place the sample on a slide.

Information in addition to the slide may also be obtained. For example, a user may also provide other information about the location or environment where the particles or material were obtained. Additionally, other information may be included such as health symptoms, ages, a serial number linked to a location or customer, a type of sample, or the like.

The slides and other information may be received from a user, customer, technician, or other entity that has obtained and forwarded one or more samples. For example, a lab worker may receive the one or more slides and load the slides into a scanner for imaging. In one embodiment, the lab worker may scan a barcode on the slide that links the slide with other information about the slide (e.g., a customer, location, health symptoms, and sample type). The barcode may be used to automate where to look on the slide to locate the particulates from the sample. For example, the barcode may identify a manufacturer, customer, or party or entity that obtained the slide because the manufacturer, customer, or party or entity that obtained the slide may indicate where the sample is actually located. In some cases, it can be difficult to locate particulates on a slide, such as mold spores, if you don't know where the sample was placed on the slide. For example, the slide may be much larger than the actual sample so it is often efficient to only scan/image the portion of the slide where the particulates are located. Knowing the entity, customer, or slide manufacturer (or brand) may allow a scanning system to automate location and scanning of the relevant portion of the slide.

Samples may be imaged using a wide range of different imaging techniques and at a wide range of different zoom levels. Example scanners or imagers that may be used include a digital microscope, bright-field microscope, polarized imager, phase contrast image, fluorescence imager, scanning electron microscope, dark-field microscope, or other types of scanners/imagers. During scanning or imaging of the sample, the scanner (such as a digital microscope) may be used to scan or image the whole area where the sample is located (e.g., where any mold particulates or other materials are located). These obtained images may be quite large in pixel count and memory size. For example, the images may be in full-color (16 bit, 24 bit, 32 bit or more) with very high resolution (pixel count and/or dots per inch). In one embodiment, the imaging/scanning process obtains not only images of the whole area, but also images at different resolutions. For example, the sample area may be divided up into a grid of smaller sized areas, which are each imaged at a high zoom level and then multiple grid areas may be imaged together at a lower/wider zoom level. Different zoom levels may be helpful in imaging/identifying different sizes of particulates or detecting details for identifying different material types. For example, a single sample may include particles of different sizes that would be helpful to detect and identify.

After imaging, the resulting digital images may be stored or associated with a serial number identifying the location where the sample was taken, a customer that obtained the image samples, or any other information about the location, sample, type, study type, medical conditions, or the like.

The digital images may be stored and transmitted to a cloud storage or remote storage location for training, analysis, classification, association or aggregation with other data, or the like. For example, the lab may acquire the images and upload to a file server. The file server may include a listener that detects the uploading of new images and uploads those to a remote classification system for classification, storage, reporting, and/or sharing. Related data may also be uploaded with the image for storage at a remote or cloud location. Custody tracking of the sample, digitized images, and associated data may be provided to ensure security and accuracy of the data. In one embodiment, images, customer information, health information, or the like may be associated with a common serial number or other identifier so that correlations between various data can be determined.

Data stored in the remote or cloud storage may include data, including images and related data, from a large number of different labs, customers, locations, or the like. The stored data may be accessible to a classification system that includes a classification model, neural network, or other machine learning algorithm. The classification system may classify each image (or sample associated with the image) as including a particular type of particle. For example, the classification system may analyze each image to classify or detect particles within the images. A particle may be classified as a specific genus or species of mold spore, or other particle type. For example, the classification system may generate a heat map for an image indicating which regions of the image include different types of particles.

As another example, the classification system may generate bounding boxes and then detect/classify particles in the bounding boxes. For example, the bounding boxes may indicate regions where there is likely something to be present (e.g., a mold spore) to be classified or detected. This may allow analysis or processing of only portions of the image using a neural network or algorithm to locations where particles or materials are present and ignoring regions where there are not particles. For example, large regions of an image may be blank or white space where no particles are present. Processing blank or white space regions using neural networks may be a waste of computing resources. The model or neural network used by the classification system may include a system trained based on human classified images or samples. For example, the neural network may be trained using supervised learning. In one embodiment, learning and training may be performed using unsupervised machine learning.

In one embodiment, the classification system may provide one or more images (or portions of images) of samples to users for classification. For example, previously classified or unclassified images may be provided to one or more experts for classification. The experts may provide their own classification, which may be used to either confirm or change an original classification. The machine learning algorithms, models, or neural networks may be retrained based on the updated classifications to further improve machine learning models and algorithms. In one embodiment, changes to classifications for specific particles or images may be tracked. Tracked classifications may provide additional data about the accuracy of classifications and can lead to further refinement in machine learning and classification algorithms and models.

Based on classification of particles within samples, reports may be generated for the type of study that is being performed for a location, patient, or customer. The report may be generated based on the classification of particles within images of samples, particle counts for different particle types, health conditions related to the presence or counts for specific particle types, or the like. The report may be automatically generated specific to the serial number, customer, and/or location associated with the images and the corresponding sample. In one embodiment, a report may include a report for the types of particles detected, the number of particles, likely conditions in the sampled environment or patient, recommended steps to be performed, or the like. The report may be provided as a general report for a specific particle type or may be more general to health or conditions for a sample environment.

As used herein, the term "particle" is given to mean any small unit or portion of material such as dust, mold sports, cells or groups of cells, fibers, small chunks of materials, organism(s), tissue, biological matter, minerals, or any other item or material discussed herein as being classified or detected. Additionally, the classification, detection, or identification of particles may include identifying a specific type of particle or condition of a specific particle or material.

Embodiments disclosed herein may provide significant utility and benefits. For example, automated particle classification, report generation, and/or the like may significantly reduce expert time and/or errors (such as typographical errors), thereby increasing efficiency and accuracy. At least some embodiments disclosed herein enable the full classification of each particle within a whole sample. Generally, technicians do not have enough time, nor are they required to, analyze every particle or the full sample for particle type or classification. Additionally, it can take a large amount of time for a technician to perform particle analysis and classification within a sample. This time can be saved by using machine learning algorithms and/or deep neural networks for automated computer or machine learning classification. Accuracy may be increased because a greater portion of the slide (or sample) is actually analyzed and because embodiments of machine learning algorithms or models may provide greater classification accuracy for a particle type and even for a larger number of different particle types.

Embodiments disclosed herein further allow for the long-term storage and use of samples because they are stored as digitized images and stored in a central location. Machine learning algorithms may be refined based on the large corpus of data and thus improved particle identification algorithms and machine learning results may be obtained. Error in report creation may also be decreased because typographical errors by humans may be reduced or eliminated. For example, even if a generated report is modified by a human user or technician after generation, the report details may reduce the chance of filling out a report with information from an incorrect sample, customer, location, or the like. Furthermore, the tracking of the movement of the sample, digital images, associated health or location data, changes in particle classification, or the like may lead to quicker and more accurate reporting to clients. Additionally, more accurate tracking may lead to less management overhead and reduce the amount of time it takes to place a process in a final state so that a report and/or bill may be sent to a customer. Thus, a larger number of customers may be served and even better identification and reporting results may be obtained.

In some cases, distinctions between different particles, or distinctions between different classifications of the same particle type may not be detectable visually for humans. Because existing classification methods for particles depend on human classification using the same channel as the human (e.g., visual detection/classification based on an image), existing systems and methods are unable to distinguish between particles that are indistinguishable to humans.

However, Applicant recognized that, at least in some cases, machine learning algorithms and models, such as deep neural networks, can be trained to perform better than humans in visual classification and detection. As such, Applicant developed, and herein discloses, systems, methods, and devices for mold classification using out-of-channel means for establishing ground truth. In one embodiment, a method for classifying or detecting a mold sample includes obtaining a microscopy image of a mold sample. The method includes determining a classification of the mold sample based on non-image data corresponding to the mold sample. The method further includes training a neural network based on the microscopy image and a label indicating the classification.

The non-image data may include any out-of-channel means for determining the classification for the mold. Example out-of-channel means include a DNA test, a polymerase chain reaction (PCR) test, a known source location for a mold sample (e.g., a population that has been cultured or identified in nature), observing a sample or cultured population at a higher resolution than the scanned image via more powerful microscope or using oil immersion, or a fluorescent imaging test (e.g., using a fluorescent imaging scanner). Other out-of-channel means may also be included and may include any non-image means of determining a classification. Just because a human is not able to identify a visual distinction based on an image does not mean that the image does not include features or data that can be used by a neural network other machine learning algorithm to distinguish between classifications. Because out-of-channel means may be used to reliably classify a particle, the out-of-channel means may be used as ground truth for training.

In some cases, it can be difficult to acquire sufficient training data to distinguish between similar mold spores or other particles. For example, images of some types of mold spores may be rare or hard to find. As another example, some types of mold spores may be found in some samples, but may only be rarely, if ever, found in the same sample. If mold spores are found in different samples, using these different samples for training may lead to an algorithm or neural network performing classifications based non-relevant distinctions, such as a background color of a sample.

Applicant further developed systems, methods, and devices for generating synthetic images for training that overcome problems with less common particles types or for training between visually similar but not co-located particles. One embodiment of a method for training a neural network for mold spore classification includes obtaining a first image of a sample or cultured population. The method includes extracting portions of the first image that correspond to mold spores, the mold spores having a known classification based on the sample or cultured population. The known classification may be determined, for example based on an out-of-channel means (e.g., method of determining the classification based on non-image data). The method includes placing the extracted portions of the first image on a background to create a synthetic image. The synthetic image and a label indicating the known classification may then be used to train a neural network.

In one embodiment, if a mold sample only includes a small number of mold particles (or other type of biological particle), the mold sample may be cultured to generate a larger cultured population. The larger cultured population may be imaged and used for generation of a synthetic image. In one embodiment, two mold samples that have different classifications, which have been determined based on out-of-channel means, but are visually indistinguishable to humans, may be used to generate synthetic images having particles with the two different classifications. This can enable machine learning microscopy to distinguish between previously visually indistinguishable mold spores or other particles.

Various examples and embodiments disclosed herein include neural networks as a computer model for machine learning, training, and/or classification. Although neural networks may be used in at least some embodiments, one of skill in the art will recognize that other types of computer models, statistical models, or machine learning models may be used instead. Thus, neural networks are used as one example of a model and the disclosure is not limited to neural networks.

A detailed description of systems and methods consistent with embodiments of the present disclosure is provided below. While several embodiments are described, this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

FIG. 1 is a schematic block diagram illustrating a system and environment for obtaining, classifying or detecting, and/or sharing digitized images of particle or material samples, according to one embodiment. The system 100 includes an imaging system 102 and a particulate classification system 104. In one embodiment, samples may be obtained from a location or environment by a technician or professional 106. The technician or professional 106 may include a person that has been trained or licensed to obtain samples. The samples may include samples from any source, location, or environment disclosed herein. For example, an air sample, tape sample, surface sample, or other sample that may capture mold spores may be obtained.

A technician or professional 106 may also obtain any other information about the sample including a source of the sample, a location, a sample type, a study or testing purpose, a customer or patient identifier, a date, temperature or weather conditions, or any other information about or related to the sample. This information may be logged by the technician or professional 106 into a computer system or other database and associated with the sample, such as by associating the sample, customer, or patient identifier. This information may be provided to and/or stored in the classification system 104 and/or a data store 112. The technician or professional 106 may obtain the sample in response to a request or approval by a customer or patient. The customer or patient may agree that the data will be used for research/big data purposes.

After the samples are obtained, the samples may be applied to a slide 108 for preservation, shipping, standardization, or the like. The slide 108 may be provided to a lab or an imaging system 102 for imaging or digitization of the sample. When the sample is received by the lab or organization that is to digitize the sample, the lab logs the samples into the lab's software to a customer's job. The customer at this point may be the original customer, patient, or the inspecting organization. A customer account may be created in the labs software and/or in software for the classification system 104. The lab may create a job for the sample or customer in the lab's or particulate classification system's software. The software may link the sample to the customer and job based on a sample serial number.

If a lab or customer does not have an account with the classification system 104, an account may be created and any necessary software may be installed on a lab computer. For example, a user account with information about the lab or customer may be generated and authentication details may be provided for using the account. As another example, the classification system 104 or another party may, at times, need to uniquely identify the scanner or lab from which the digital samples will be provided.

When the slides are received and a job is created in a corresponding account, the lab may prepare the slide for digitization. For example, the slide may be stained, covered with a cover slip, or the like, as necessary. The slides may be loaded into the scanner (such as a digital microscope or other imaging device discussed herein). Depending on the type of sample or manufacture for the sample media, the slide may be loaded such that a pre-selected area will be scanned. For example, samples or slides for different sources (such as customers or manufacturers) may position the sample consistently at a specific location in the slide. This can make it easier for a technician or the imaging system 102 to determine what portion of the slide to image. For example, the particulates or materials of a sample can be very small and may not be visible to the naked eye. Thus, it can be difficult for a user to see what portion of the slide needs to be imaged. If the sample is a tape sample or other sample that may not have a consistent location, a user may need to select the sample size and set the focus points manually. The scanner then images the sample and automatically loads the sample images up to the classification system 104 over a network 110. The sample images may be stored within or associated to the account of a lab or customer account and/or may be associated with any other data gathered about or in relation to the sample.

The classification system 104 may receive images from the imaging system 102 and/or images from a large number of imaging systems 102 for the same or different labs. In one embodiment, the images may be stored in a data store 112. In one embodiment, once the images are processed and/or stored, a notification may indicate that there are new samples ready to be processed.

In one embodiment, samples, or particles within samples, may be automatically classified by a deep neural network or other machine learning classification algorithm of the classification system 104. For example, images may be fed to a neural network classifier, which outputs an indication of what type of particle(s) is/are in the image. In one embodiment, a scaled or raw subsection of an image having pixel dimensions required by the neural network or classification algorithm may be provided to the neural network or classification algorithm. In one embodiment, the same image or section of image may be processed by a plurality of neural networks to determine what types of particles are in the image. The classification algorithm or network may indicate a probability that the image includes particles of a particular type.

The classification system 104 may process all images correlating to a sample imaged by the imaging system 102. For example, the classification system 104 may perform a machine learning algorithm on all images and/or all portions of the image to obtain an extremely accurate classification of most or all particles within the images. This provides considerable accuracy and completeness because human technicians generally don't have the time or ability to analyze all portions of a sample where particulates are located. With machine learning processing of each image corresponding to a sample, an extremely accurate particle count, particle type count, and the like may be achieved.

In one embodiment, samples, or particles within samples, may be classified or reviewed for classification by a human worker. For example, as a neural network or machine learning algorithm is being trained, human review or initial classification of a particle may be required. When samples are ready to review, samples may be grabbed and worked on by a technician working on a local or remote computer 114. After selecting the sample from a list needing attention, the technician is presented with the cut out particulate images. For example, the images may be cropped in order to provide an image where the particle or material is large enough to be viewed or observed by the user. The technician may be able to provide an initial classification, or review and re-classify or modify a classification given by a neural network, which may then be fed back into the machine learning as new samples for further training of a model or network.

In one embodiment, images may be shared by a technician with a colleague by clicking on a share option. The image may be sent by the classification system 104 via email to a registered user with a link that takes them to the image. During the classification stage, any notes from the technician could be added to an image or section of the image. If the context of the image within the sample is needed for the report, the user may indicate the larger area surrounding the sub section to be saved to notes to be included as part of the report or for later use. The technician may provide an indication that gives their approval that the sample has been reviewed and that a particle or material is correctly classified. In one embodiment, a technician could repeat this process until all of the slides/images pertaining to this particular customer job have been reviewed and approved.

The classification system 104 may include a reporting component for generating reports. The classification system 104 may automatically generate a report based on the identification of particles in an image of the slide and/or a report, investigation, or examination type corresponding to the slide or sample. The report may include information about particle types, particle counts, health impacts, instructions to check for certain health symptoms, potential remedies to reduce or increase particulate counts, or the like. In one embodiment, a report generation process can be started by selecting a button or menu on a list of jobs (e.g., customer jobs for sample processing). The classification system 104 may generate a report template that shows the types of materials and particulates found, a customer or serial number, account information, health symptoms, or any other information related to a specific report or examination type. For example, the template report may include health concerns if these particulates are found and potential investigation/remediation steps.

In one embodiment, the generated report or report template may be provided to a technician for review, confirmation, and/or transmission to a client. The technician or other report writer may be able to provide input to modify the report, add pictures to the report from a list of saved pictures for that customer, save and sign a report, and/or trigger sending of the report (such as via email in a .pdf file) a company or customer that requested the report. Once the report is sent, lab management software of the imaging system 102 or classification system 104 is notified that the report has been delivered.

In one embodiment, the classification system 104 may export information for external report generation. For example, the classification system 104 may be able export information in a format or condition that another software program can generate a report based on the information. In one embodiment, if a user prefers not to use the built-in report writer, the user should be able to export the data and pictures to lab management software of the user's choice. The text information may be exported in a .csv file or .xml file, in one embodiment. In one embodiment, the images may be exported to a unique directory or file for access by the external report generation program or user.

Upon classification and/or reporting, a specific job may be marked as complete. In one embodiment, the information may be archived. For example, 6 months after a completion date for the job, the customer job may go to an archived state for 5, 10, 20, or more years. In one embodiment, the data may be kept indefinitely for research use or as test/research data for improving a machine learning or deep learning algorithm or model. In one embodiment, archived information may be searched based on any relevant information, such as location, barcode of slide, or any other information associated with an image, slide, customer, or job.

In embodiments where the classification system 104 is accessible from a remote location, such as via the Internet, significantly improved machine learning and classification may be possible. For example, in machine learning applications the cost of obtaining data and obtaining annotations of the data (e.g., an indication of a classification) can be extremely time consuming and/or difficult to obtain. The remotely accessible classification system 104 may train algorithms based on all images of the same type of material and thus those accessing the classification system 104 may obtain the benefits of large datasets that a party may not otherwise be able to obtain. For example, some types of examinations may not occur frequently enough within a given organization to obtain enough data to train a machine learning model or neural network. By sharing data among different locations and even organizations, even examinations that occur infrequently for each organization may occur frequently enough in combination to adequately train machine learning models or networks.

Figure 2:
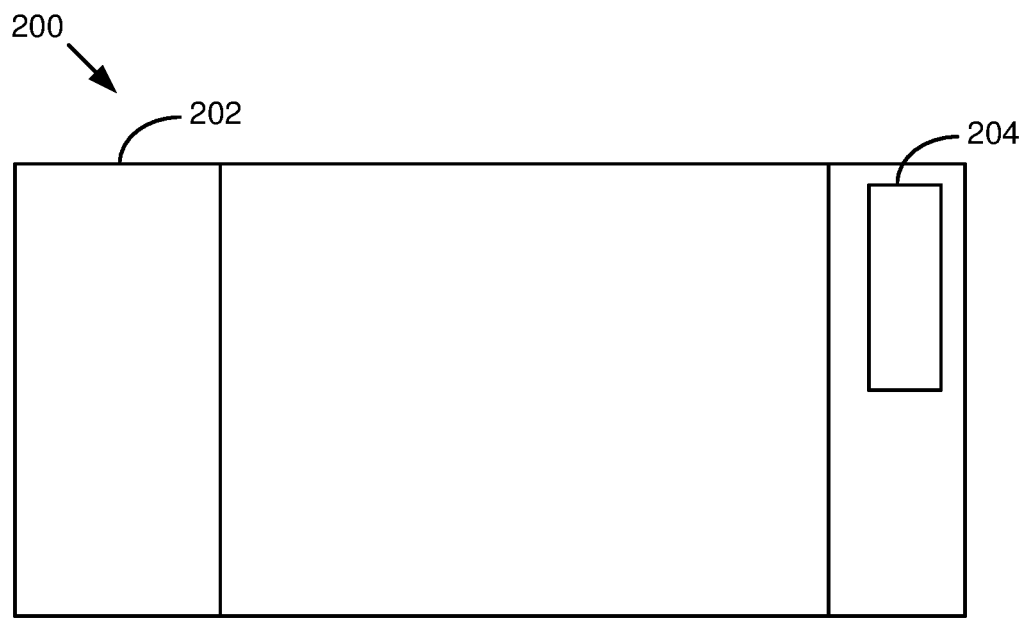
FIG. 2 illustrates a schematic diagram of a sample slide in accordance with the teachings and principles of the disclosure.

FIG. 2 is a schematic diagram illustrating an example sample slide 200, according to one embodiment. The slide 200 includes a region 202 where the sample is located. For example, a tape sample, air sample, liquid sample, smear, or other particles from a sample may be located only in the region 202 so that it is not necessary to image any other portions of the slide 200. The slide 200 also includes a label 204 which may include a barcode, serial number, brand, or other identifier. The identifier may be used to determine that the sample is located within the region 202. For example, the imaging system 102 or technician may know or determine where to position and/or scan the slide 200 based on the label 204.

Figure 3:
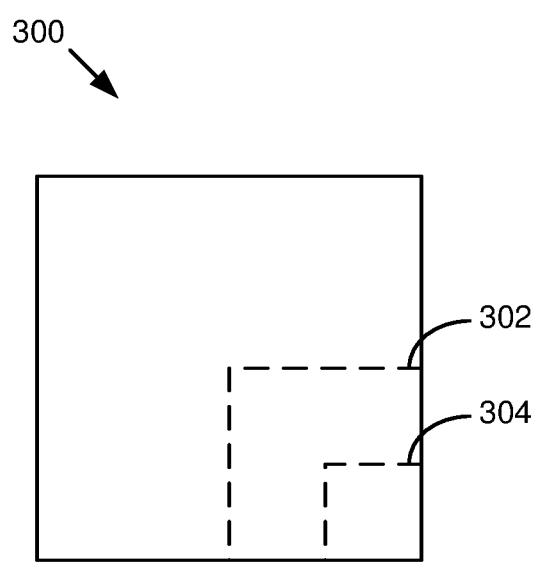
FIG. 3 illustrates is a schematic diagram illustrating a section and subsections of a digitized image obtained of a sample in accordance with the teachings and principles of the disclosure.

FIG. 3 is a schematic diagram illustrating a section 300 and subsections 302, 304 of a digitized image obtained of a sample slide, according to one embodiment. The section 300 may include a portion of the region 202 of the slide 200, subsection 302 includes a quarter of the section 300 and subsection 304 includes a sixteenth of section 300. In one embodiment, full resolution images of the section 300 may be obtained at different zoom levels. A first zoom level image may be obtained at a wider zoom to capture the whole section 300. Four images at a second zoom level covering a region the size of subsection 302 may be obtained of the section 300. Sixteen images at a third zoom level covering a region the size of subsection 304 may be obtained of the section 300. Thus, a plurality of images of the same region, at different zoom levels may be obtained. The different zoom levels may be useful in identifying or classifying or detecting different size particles. For example, mold spores are generally smaller than insects and thus may require a higher zoom level image to accurately detect or classify. Other zoom levels may be used to obtain desired levels of detail based on the specific types of particles or materials that are to be detected.

Figure 4:
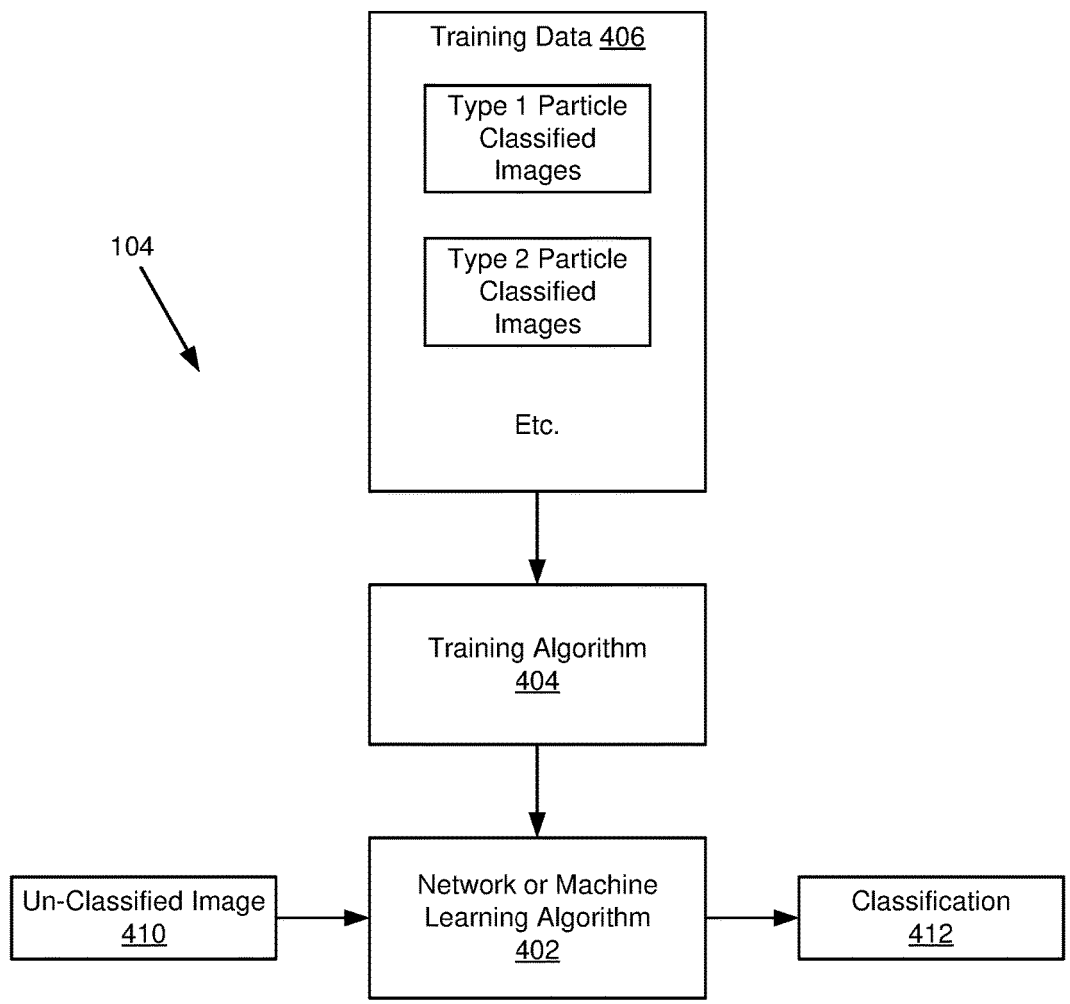
FIG. 4 is a schematic block diagram illustrating operation of a classification system in accordance with the teachings and principles of the disclosure.

FIG. 4 is a schematic block diagram illustrating operation of a classification system 104, according to one embodiment. In one embodiment, a network or machine learning algorithm 402 (which may also be referred to as a hypothesis), may be trained and used for identifying and classifying or detecting particles in an image. The network or machine learning algorithm 402 may include a neural network, such as a deep convolution neural network, or other machine learning model or algorithm for classifying or identifying particle types.

In one embodiment, the network or machine learning algorithm 402 is trained using a training algorithm 404 based on training data 406. The training data 406 may include images of particles or materials and their designated classifications. For example, the training data may include images classified as including particles or materials of a first type and images classified as including particles or materials of a second type. The types of the particles or materials may vary significantly based on the type of examination or report that is needed. Training data for any other type of particle, material type, or the like may be used. For example, training data for any particles that are to be identified by the machine learning algorithm 402 may be provided. Using the training data, the training algorithm 404 may train the machine learning algorithm 402. For example, the training algorithm 404 may use any type or combination of supervised or unsupervised machine learning algorithms.

Once the network or machine learning algorithm 402 is trained, the network or machine learning algorithm 402 may be used to identify or predict the type of particle within an image. For example, an unclassified image 410 (or previously classified image with the classification information removed) is provided to the network or machine learning algorithm 402 and the network or machine learning algorithm 402 outputs a classification 412. The classification 412 may indicate a yes or no for the presence of a specific type of particle. For example, the network or machine learning algorithm 402 may be targeted to detecting whether a specific type of mold, bacteria, particle, or material is present in the un-classified image 410. Alternatively, the classification 412 may indicate one of many types that may be detected by the network or machine learning algorithm 402. For example, the network or machine learning algorithm 402 may provide a classification that indicates which type of particle is present in the un-classified image 410. During training, the classification 412 may be compared to a human classification or an out-of-channel classification to determine how accurate the network or machine learning algorithm 402 is. If the classification 412 is incorrect, the un-classified image 410 may be assigned a classification from a human and used as training data 406 to further improve the network or machine learning algorithm 402.

In one embodiment, both offline and online training of the network or machine learning algorithm 402 may be performed. For example, after an initial number of rounds of training, an initial accuracy level may be achieved. The network or machine learning algorithm 402 may then be used to assist in classification with close review by human workers. As additional data comes in the data may be classified by the network or machine learning algorithm 402, reviewed by a human, and then added to a body of training data for use in further refining training of the network or machine learning algorithm 402. Thus, the more the network or machine learning algorithm 402 is used, the better accuracy it may achieve. As the accuracy is improved, less and less oversight of human workers may be needed.

Figure 5:
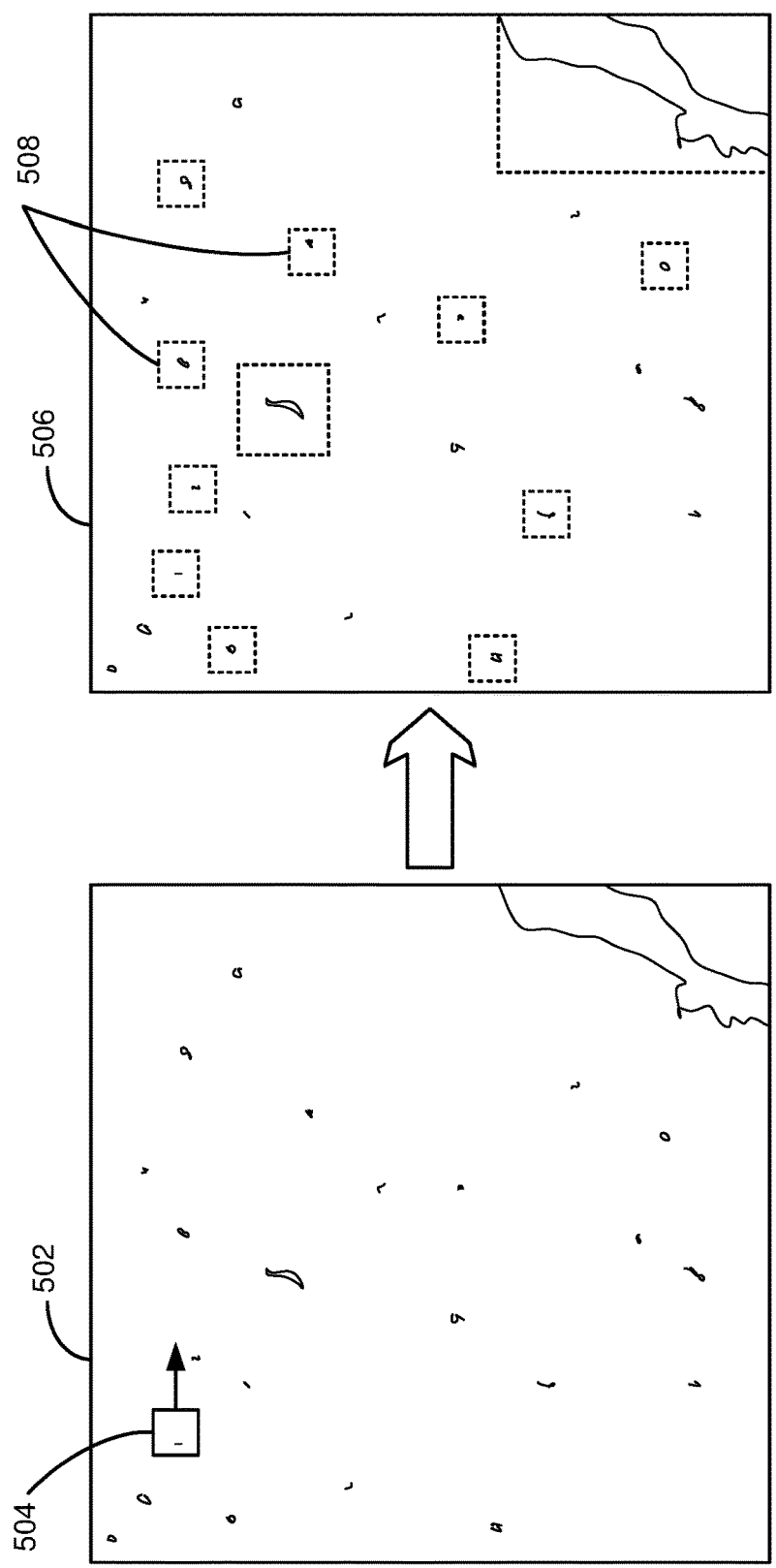
FIG. 5 graphically illustrates a method for classifying or detecting particles in an image to generate a heat map or bounding boxes in accordance with the teachings and principles of the disclosure.

FIG. 5 provides a graphical representation of classifying or detecting particles in an image 502 using a sliding window 504 to classify sub-portions of the image and generate a heat map 506. In one embodiment, the classification system 104 may generate the heat map 506 by analyzing a portion of the image 502 within a current position of the window 504 using the network or machine learning algorithm 402 to classify or detect particles within the window 504. For example, the window 504 may start at the upper left corner of the image 502 and the network or machine learning algorithm 402 may output a classification for that region. The classification may include an indication of the particle type, an indication that there is a particle, and/or an indication that there is no particle at the position (e.g., blank white space).

After classification at that position, the window 504 may be moved over to the right. The new position may immediately border or partially overlap with the previous position of the window 504. The section of the image 502 within the window 504 at the new location may be analyzed. The classifications may be tracked for each position as the process is iterated to move the window 504 across and down (or in any other systematic or random pattern) so that every section of the image 502 has been within the window 504 at least once during the process. Based on the classification for the window at each position, a heat map 506 may be output. The heat map 506 includes a plurality of regions 508 (designated by regions surrounded by dotted lines) that indicate regions where certain types of particles have been detected. In one embodiment, each region 508 may have a different classification, as determined by the network or machine learning algorithm 402. For example, the heat map 506 may indicate that a first type of particle is located at a first location and that a second type of particle is located at a second location. In one embodiment, the section of the image 502 may be analyzed using an additional sliding window of a different size. For example, larger sliding windows may be use to detect particles and/or particle types of different sizes.

Based on the heat map 506, the sample may be classified has having the types of particles identified during the classification process. In one embodiment, cropped images including the regions 508 may be generated and stored as examples of specific types of particles. In one embodiment, the cropped images may be reviewed by a human reviewer or expert for quality control or may be used on a report to illustrate the particles that are present in an image or sample.

In one embodiment, instead of generating a heat map, the classification system 104 may generate bounding boxes and then execute classification/detection algorithms on the content of the bounding boxes. For example, the classification system 104 may use a sliding window to detect regions where particles are present to generate a plurality of bounding boxes. Since some of the bounding boxes may be duplicates or overlap, the classification system 104 may remove or combine duplicate/overlapping boundary boxes to form a subset or new set of bounding boxes. Those bounding boxes (or the pixels in those bounding boxes) may be classified at the same time or be fed separately into the same or different neural networks, or other machine learning model, for processing and for identification/detection of particles.

Similarly, the methods and steps illustrated in relation to FIG. 5 may also be used on training data to extract particles for training or determining ground truth during a training step. For example, a training image (such as a synthetic image discussed in relation to FIGS. 7 and 8) and labels may be provided to a training algorithm to train a neural network or algorithm to detect and classify particles.

Figure 6:
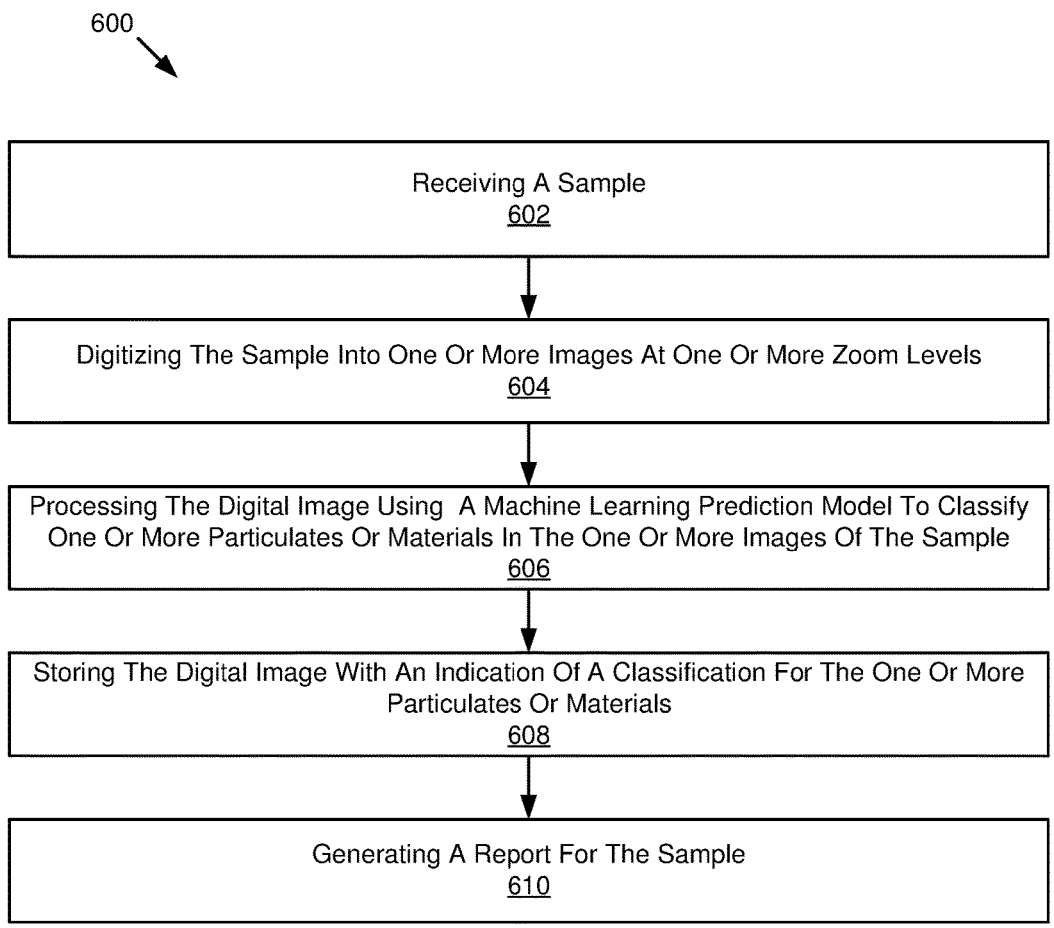
FIG. 6 is a schematic flow chart diagram illustrating a method for classifying or detecting particles or materials in a sample in accordance with the teachings and principles of the disclosure.

Referring now to FIG. 6, a schematic flow chart diagram of a method 600 for classifying a sample is illustrated. The method 600 may be performed by a classification system, such as the classification system 104 of FIG. 1.

The method 600 begins and a lab receives 602 a sample. An imaging system 102 digitizes 604 the sample into one or more images at one or more zoom levels. A classification system processes 606 the digital image using a machine learning prediction model to classify or detect one or more particulates or materials of the sample. The classification system stores 608 the digital image with an indication of a classification for the one or more particulates or materials. A report component generates 610 a report for the sample based on the classification for the one or more particulates or materials.

As discussed previously, machine learning algorithms or neural networks must generally be trained before using them. However, training data can be difficult to obtain. With regard to mold spores, for example, images of specific types of mold spores may be rare. Similarly, it may sometimes be necessary to distinguish between two very similar mold spores (or visually identical at least to a human). Such training may be difficult to do well without samples containing both types of mold spores since other differences in the slide, background material, included material, or the like in a sample may differ between samples. If the two different classifications of mold spores are not located in the same imaged sample, then the training algorithms may inaccurately distinguish between particles based on these other details which may lower classification accuracy.

In order to improve distinction between visually similar or hard to find particles, synthetic images may be generated for training. For example, particles or mold spores may be segmented from different source images and placed on a shared background to create a synthetic microscopy image. Particles or mold spores may be segmented from the source images using automatic segmentation algorithms, such as intelligent scissors, magic scissors, watershed, grabcut, TVSeg, segmentation, or boundary finding algorithms. For example, a source image (e.g., an image of a cultured population or sample of mold spores) may be processed to locate spores or particles within the source image and/or create bounding boxes around the spores or particles. Once those locations are determined, an automatic segmentation algorithm may be used to "cut out" the pixels corresponding to the particle within the bounding boxes and then "paste" them onto a background to create the synthetic image.

Figure 7:
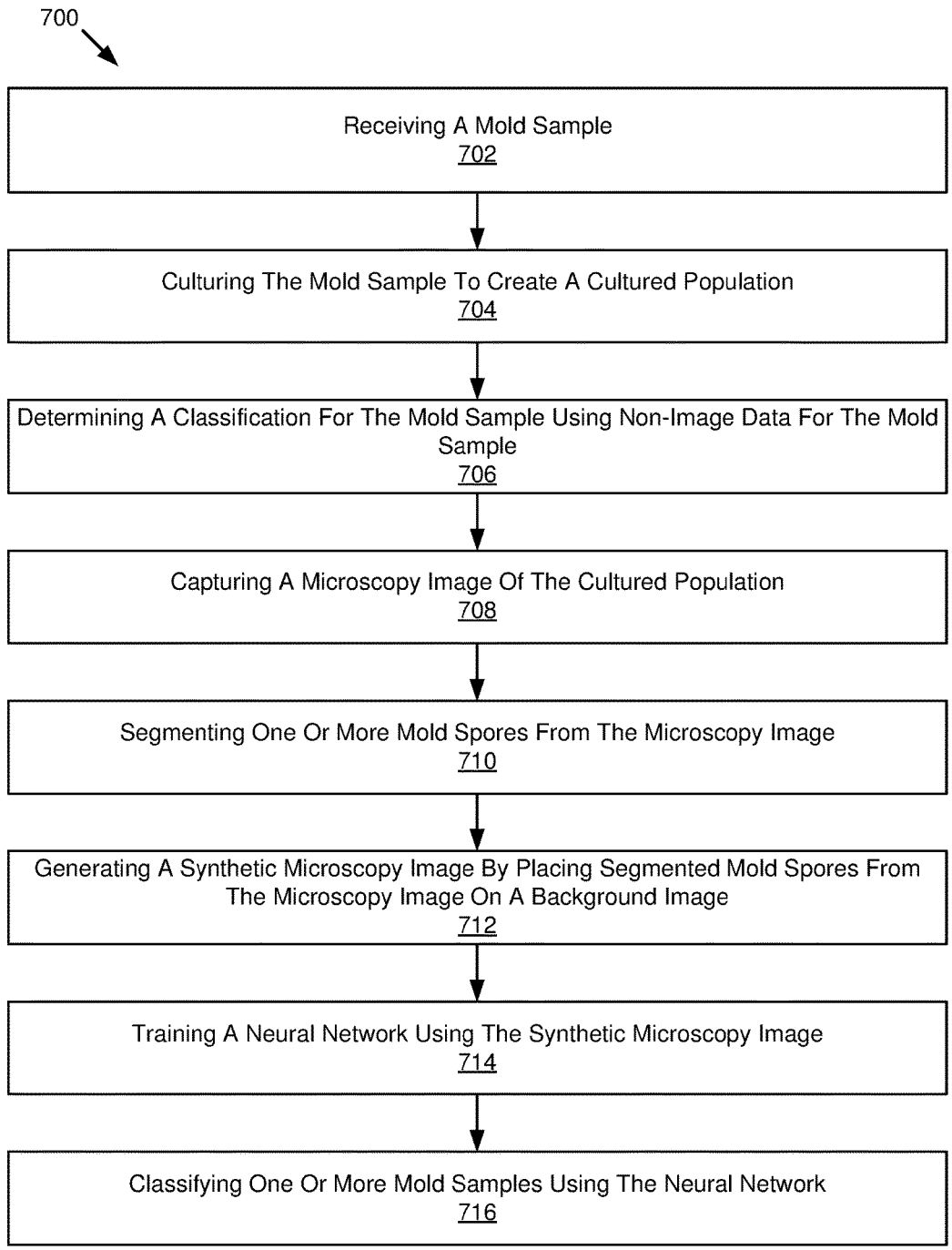
FIG. 7 illustrates a block diagram of an example computing device in accordance with the teachings and principles of the disclosure.

FIG. 7 is a schematic flow chart diagram illustrating a method 700 for training a neural network or machine learning algorithm, according to one embodiment. The method 700 may be performed, at least in-part, by a classification system or other system, such as the classification system 104 system 100 of FIG. 1. The method 700 may include any combination of the displayed steps, sub-methods, functionality or the like, without limitation.

The method 700 begins and a mold sample is received at 702. The mold sample may be a physical mold sample, such as a mold sample gathered as part of an air, tape, or other sample. The mold sample may include a sample that has been applied to a slide for imaging. The mold sample is cultured at 704 to create a cultured population of the mold. The cultured population may include a plurality of mold spores, which result from the culturing at 704 of the original mold sample. A lab technician may place one or more mold spores on a dish or slide for culturing or growing a larger population of the mold and/or to produce more mold spores. The cultured population may be created based on a very small number of mold spores that can be verified as the same type. For example, the mold spores may be identified as the same type or class of mold using any of the imaging or non-imaging methods discussed herein. In one embodiment, the mold sample is allowed to culture or grow on a slide that can later be imaged.

The method 700 includes determining at 706 a classification for the mold sample using non-image data for the mold sample. In one embodiment, the mold sample or cultured population may be examined to determine at 706 the classification or type of the mold sample. For example, mold grown in the cultured population from a mold spore may be examined for identification. Similarly, one or more tests discussed herein, such as a DNA test, a PCR test, a fluorescence test, or any other test or examination may be used to determine the classification for the mold sample or culture population. In one embodiment, the classification of the mold sample may be determined with sufficient accuracy based on a location where the mold sample was gathered. In one embodiment, the classification for the mold sample is determined at 706 based on out-of-channel means, such as by any data not included in an image of the mold sample or cultured population.

The method 700 includes capturing at 708 a microscopy image of the cultured population. For example, an imaging system 102 may capture an image of the cultured population or spores obtained from the cultured population using a microscope. The imaging system 102 may capture the microscopy image of a slide holding the spores or cultured population.

The classification system 104 segments at 710 one or more mold spores from the microscopy image. For example, the classification system 104 may process the microscopy image to generate a heat map or bounding boxes that indicates where particles or spores are located. Portions of the microscopy image where mold spores or other particles are located may be extracted or segmented from a background of a slide. In one embodiment, the classification system 104 segments at 710 the particles or mold spores using a boundary finding algorithm, a smart scissors or magic scissors algorithm or tool, or other segmentation tool or algorithm. The classification system 104 may segment the pixels of a mold spore along an edge or boundary so that the segmented portion has a size and shape matching the mold spore. In one embodiment, background pixels are left behind so that only pixels corresponding to the mold spore are segmented.

The classification system 104 generates at 712 a synthetic microscopy image by placing segmented mold spores from the microscopy image on a background image. The background image may include a solid background having a desired color. For example, the color may match the color of expected microscopy images that may be obtained and processed for particle/mold detection. Example colors include white or off white colors that may be encountered in different environments or imaging systems 102. Furthermore, a plurality of different synthetic images may be generated having different colors so that a trained system is not classifying particles based on differences in background colors for slides or samples. In one embodiment, the different color may be a variation of color temperature or a different off-white shade. For example, the background may have a blue or red color temperature to simulate different imaging systems or environments that may occur with real world data.

In one embodiment, the background image comprises an image of a "dirty" slide that does not include the particles to be used during training. For example, if a neural network is going to be trained to classify mold spores, the image of the dirty slide may be completely free of any mold spores, although it may have dust or other particles that were caught in the sample. In one embodiment, the dirty slide may be substantially free from any mold spores.

In one embodiment, a plurality of different classifications of mold samples, cultured populations, and images may be obtained to create a synthetic image that includes a plurality of different classifications. For example, visually similar mold spores with different classifications may be placed on the same synthetic image to improve the ability of a trained neural network to distinguish classifications of the visually similar mold spores. Two or more different classifications of particles may be placed in the synthetic image so that improve distinction between the classifications can be achieved.

In one embodiment, the method 700 also includes logging a location within the synthetic image of a segmented and placed mold spore as well as a classification for the mold spore. This may allow the classification for a specific mold spore to be used as a label during training.

The classification system 104 trains at 714 a neural network using the synthetic microscopy image. The classification system 104 may provide the synthetic image along with the determined known classifications performed at 706 to a training algorithm for training a deep neural network or other machine learning algorithm or model. A label for each particle or mold spore in the synthetic image may be provided so that the neural network can be trained to predict a correct classification for each mold spore and classification of mold spore. For example, a label for each mold spore (or a location where the mold spore has been placed in the synthetic image) may be provided along with the synthetic image for training. Because synthetic image includes different classifications of mold spores on a same or similar background, the training algorithm 404 may train the neural network or machine learning algorithm or model to better distinguish between the different classifications of mold spores.

In one embodiment, training 714 the neural network or other model may be performed using synthetic images to initially train or prime the model. For example, because real world data may be sparse, the synthetic images may be used to initially get the model started on training. Later training sessions may use real slides that have been classified with the synthetic training data that have been corrected by a human. For example, some training sessions may use both real and synthetic slides. Over time, the synthetics slides might completely be phased out in favor of real world slides or images during training sessions.

The classification system 104 classifying at 716 one or more mold samples using the neural network. For example, after training at 714, the classification system 104 may provide one or more unclassified microscopy images to a trained neural network or machine learning algorithm or model for classification. The algorithm or model may determine a classification based on the input. In one embodiment, a deep neural network that has been trained using a plurality of synthetic images produces an output classifying one or more mold spores or other particles.

In one embodiment, the method 700 may be used to achieve high accuracy classifications for mold based solely on microscopy images of mold spores or mold samples. The method 700 may be used to classify spores or other particles that are visually indistinguishable (or that were previously visually indistinguishable) by humans.

Figure 8:
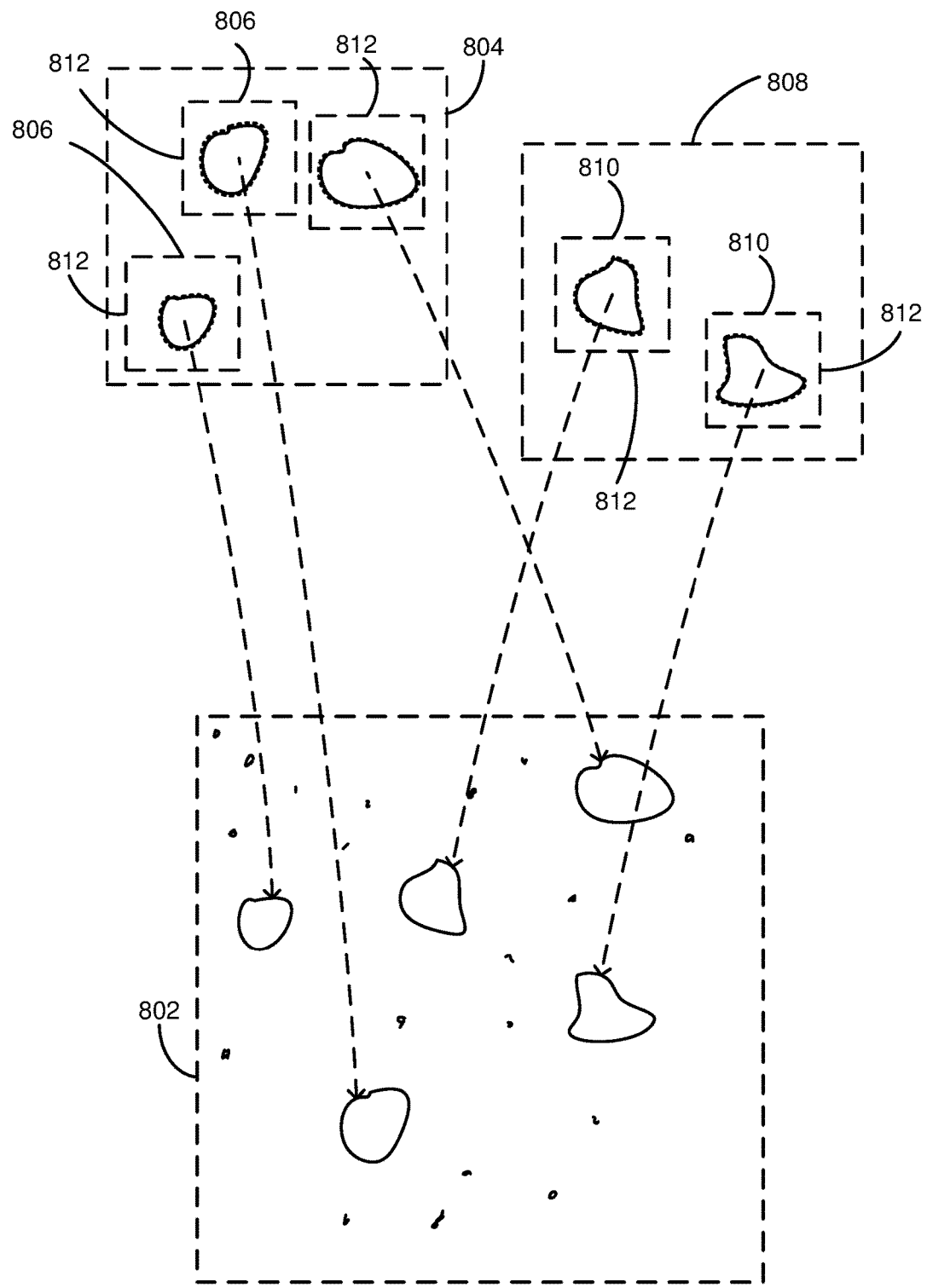
FIG. 8 is a schematic flow chart diagram illustrating a method for training a machine learning algorithm or model and classifying or detecting particles or materials in a sample in accordance with the teachings and principles of the disclosure.

FIG. 8 is a schematic diagram illustrating creation of a synthetic image 802 having mold spores of two different classifications, according to one embodiment. A portion of a first image 804 including a plurality of mold spores 806 and a portion of a second image 808 including a plurality of mold spores 810 are shown. The mold spores 806 in the portion of the first image 804 have a first classification and the mold spores 810 in the portion of the second image 808 have a second classification. The first and second images 804, 808 may include images of cultured populations or other samples that include mold or mold spores.

A classification system 104 may process the first and second images 804, 808 to generate bounding boxes 812 around each mold spore 806, 810. The bounding boxes 812 may be centered on a location of a detected mold spore or other particle in the first and second images 804, 808. Using a segmentation algorithm or tool, the classification system 104 segments the mold spores 806, 810 from other pixels (e.g., background pixels) in the bounding boxes 812. Dotted lines around each mold spore 806, 810 represent an outside boundary of regions segmented from the first and second images 804, 808 to capture pixels corresponding to the mold spores 806, 810. For example, the dotted lines may indicate the boundaries generated by a segmentation tool such as an edge finder, magic or intelligent scissors, or other segmentation tool or algorithm.

The segmented portions (within dotted lines) of the mold spores 806, 810 may be copied and placed at locations within the synthetic image 802. In one embodiment, the mold spores 806, 810 are placed at random locations within the synthetic image 806. The location where each mold spore 806 or 810 is placed may be logged and stored for use as a label during training. The synthetic image 802 may include a background having a different color background than the first image 804 or the second image 808. In one embodiment, the synthetic image 802 may include a background that includes a microscopy image captured of a clean or dirty slide. For example, an image of a slide that has a sample placed on it may be used as a background for the synthetic image to simulate what a real-world sample my look like. For example, samples or images of cultured populations may be cleaner or whiter than real world samples and may lead to lower quality/accuracy training. After placement of mold spores or particles having one or more different classifications, the synthetic image, along with label data may be used as part of a training set for training a neural network or other machine learning algorithm or model.

Figure 9:
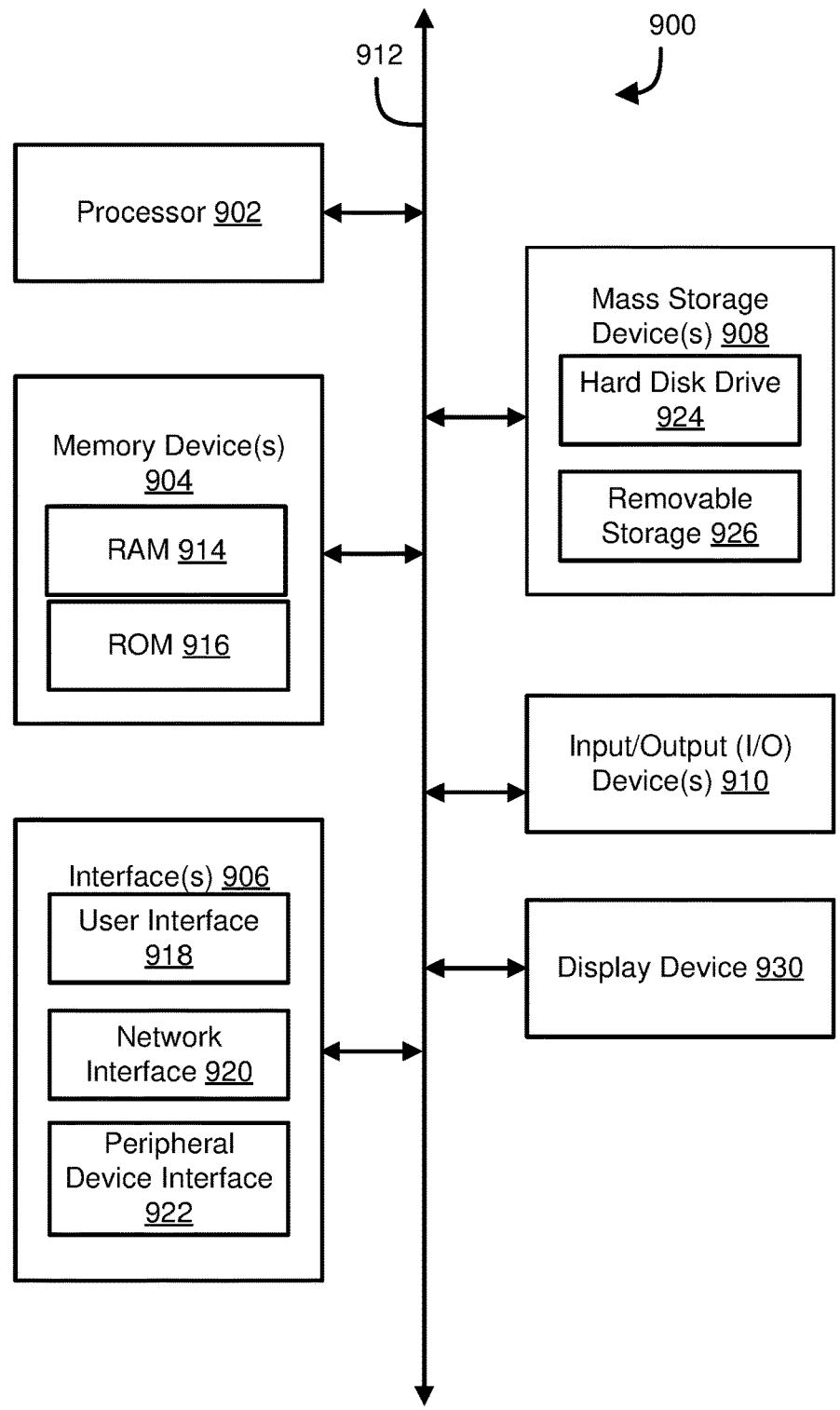
FIG. 9 is a schematic diagram illustrating creation of a synthetic image having mold spores of two different classifications in accordance with the teachings and principles of the disclosure.

Referring now to FIG. 9, a block diagram of an example computing device 900 is illustrated. Computing device 900 may be used to perform various procedures, such as those discussed herein. Computing device 900 can function as a server, a client, classification system 104, any other system or computing entity. Computing device 900 can perform various monitoring functions as discussed herein, and can execute one or more application programs, such as the application programs described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The embodiments of systems, methods, and devices discussed herein may be applied to a wide range of sample types for detection of various particles, materials, or the like. The following paragraphs describe different types of samples which may be imaged and identified using methods, systems, or devices disclosed herein.

EXAMPLES

The following examples pertain to further embodiments.

Example 1 is a method that includes obtaining a microscopy image of a mold sample and determining a classification of the mold sample based on non-image data corresponding to the mold sample. The method includes training a neural network based on the microscopy image and a label indicating the classification.

In Example 2, the determining the classification of Example 1 includes determining the classification based on a cultured population generated from the mold sample.

In Example 3, the determining the classification of any of Examples 1-2 includes determining the classification based on DNA test results for the mold sample.

In Example 4, the determining the classification as in any of Examples 1-3 includes determining the classification based on PCR test results for the mold sample.

In Example 5, the determining the classification as in any of Examples 1-4 includes determining the classification based on a known source location of the mold sample.

In Example 6, the determining the classification as in any of Examples 1-5 includes determining the classification based on fluorescence test results for the mold sample.

In Example 7, the training the neural network as in any of Examples 1-6 includes providing subsections of the microscopy image to the neural network, wherein the subsections include portions of the microscopy image where one or more mold spores are located.

In Example 8, the training the neural network as in Example 7 includes providing a label for each subsection of the microscopy image where one or more mold spores are located.

In Example 9, the obtaining the microscopy image of the mold sample in Example 8 includes obtaining a microscopy image of a cultured population based on the mold sample.

In Example 10, the microscopy image of Example 9 includes subsections where one or more mold spores are located.

In Example 11, the method of Example 10 further includes obtaining the mold sample.

In Example 12, the method of Example 11 further includes culturing the mold sample to generate a cultured population of the mold having the same classification as the mold sample.

In Example 13, the obtaining the microscopy image of the mold sample as in any of Examples 11-12 includes obtaining a synthetic microscopy image.

In Example 14, the method of Example 13 further includes generating the synthetic microscopy image.

In Example 15, the generating the synthetic microscopy image as in Example 14 includes: obtaining a first image of a sample or cultured population; extracting portions of the first image that correspond to mold spores; and placing the extracted portions of the first image on a background to create the synthetic image.

In Example 16, the extracting portions of the first image that correspond to mold spores as of Example 15 includes automatically segmenting the portions of the first image that correspond to mold spores from the first image.

In Example 17, the background as in any of Examples 15-16 includes a different color background than the background of the first image.

In Example 18, the background as in any of Examples 15-17 includes an image of a dirty slide, wherein the dirty slide is free or substantially free from any mold spores.

In Example 19, the sample or cultured population as in any of Examples 15-18 includes a first sample or cultured population and the classification includes a first classification. Creating the synthetic microscopy image further includes: obtaining a second image of a second sample or cultured population having a second classification; extracting portions of the second image that correspond to mold spores; and placing the extracted portions of the second image on the background to create the synthetic image, wherein the synthetic image includes image data for mold spores having the first classification and mold spores having the second classification.

In Example 20, the first classification of Example 19 is determined based on non-image data corresponding to the first sample and the second classification is determined based on non-image data corresponding to the second sample.

In Example 21, the first classification and second classification as in any of Examples 19-20 include classifications indistinguishable (or previously indistinguishable) to humans based on image data alone.

Example 22 is an apparatus or system including means to perform a method as in any of Examples 1-21.

Example 23 is a machine-readable storage including machine-readable instructions that, when executed, implement a method or realize an apparatus or system as in any of Examples 1-22.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, include one or more physical or logical blocks of computer instructions, which may, for instance, be organized as an object, a procedure, or a function. Nevertheless, the executables of an identified component need not be physically located together, but may include disparate instructions stored in different locations that, when joined logically together, include the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Implementations of the disclosure can also be used in cloud computing environments. In this application, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the disclosure can be included in a cloud model.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims, if any.

The invention claimed is:

1. A system for training a computer model for mold spore classification, the system comprising:
   one or more processors; and
   non-transitory computer readable storage media storing instructions that, when executed by one or more processors, cause the one or more processors to:
   obtain a first image of a sample or cultured population;
   extract portions of the first image that correspond to mold spores, the mold spores having a known classification based on the sample or cultured population;
   place the extracted portions of the first image on a background to create a synthetic image; and
   train a computer model based on the synthetic image and a label indicating the known classification.

2. The system of claim 1, wherein the sample or cultured population is generated by culturing a known mold sample to generate the sample or cultured population, wherein the known mold sample has the known classification.

3. The system of claim 1, wherein the instructions cause the one or more processors to extract portions of the first image that correspond to mold spores by automatically segmenting the portions of the first image that correspond to mold spores from the first image.

4. The system of claim 1, wherein the background of the synthetic image comprises a different color than a background of the first image.

5. The system of claim 1, wherein the background of the synthetic comprises an image of a dirty slide, wherein the dirty slide is free or substantially free from any mold spores.

6. The system of claim 1, wherein the instructions cause the one or more processors to train the computer model by providing subsections of the synthetic image to the computer model, wherein the subsections comprise portions of the synthetic image where one or more mold spores are located.

7. The system of claim 1, wherein the label comprises a label for each subsection of the synthetic image where one or more mold spores are located.

8. The system of claim 1, wherein the known classification comprises a classification determined based on a cultured population of a sample using one or more of:
   a DNA test;
   polymerase chain reaction (PCR) test;
   a known source location for a mold sample;
   a fluorescence test; and
   a microscope examination using one or more of a higher magnification than the first image or an oil immersion lens.

9. The system of claim 1, wherein the sample or cultured population comprises a first sample or cultured population and the known classification comprises a first classification, wherein the instructions further cause the one or more processors to:

obtain a second image of a second sample or cultured population having a second classification;

extract portions of the second image that correspond to mold spores; and place the extracted portions of the second image on the background of the synthetic image to create the synthetic image, wherein the synthetic image comprises image data for mold spores having the first classification and mold spores having the second classification.

10. The system of claim 9, wherein the first classification is determined based on non-image data corresponding to the first sample or cultured population, and wherein the second classification is determined based on non-image data corresponding to the second sample or cultured population.

11. The method of claim 9, wherein the first classification and second classification comprises classifications indistinguishable to humans based on image data alone.

12. Non-transitory computer readable storage media storing instructions that, when executed by one or more processors, cause the one or more processors to:

receive a microscopy image of a mold sample;

processing the microscopy image of the mold sample using a computer model to determine a classification for the mold sample, wherein the computer model comprises a computer model trained using one or more synthetic microscopy images generated by:

obtaining a first image of a first sample or cultured population;

extracting portions of the first image that correspond to mold spores; and placing the extracted portions of the first image on a background to create the synthetic microscopy image; and storing an indication for the classification of the mold sample.

13. The non-transitory computer readable storage media of claim 12, wherein the one or more synthetic microscopy images were generated by further:

obtaining a second image of a second sample or cultured population having a second classification;

extracting portions of the second image that correspond to mold spores; and placing the extracted portions of the second image on the background to create the synthetic image, wherein the synthetic microscopy image comprises image data for mold spores having the first classification and mold spores having the second classification, wherein the classification for the mold sample comprises the first classification or the second classification.

14. A system for training a computer model for mold spore classification, the system comprising:

means for obtaining a first image of a sample or cultured population;

means for extracting portions of the first image that correspond to mold spores, the mold spores having a known classification based on the sample or cultured population;

means for placing the extracted portions of the first image on a background to create a synthetic image; and means for training a computer model based on the synthetic image and a label indicating the known classification.

15. The system of claim 14, wherein the sample or cultured population comprises a first sample or cultured population and the known classification comprises a first classification;

wherein means for obtaining the first image further comprises means for obtaining a second image of a second sample or cultured population having a second classification;

wherein the means for extracting portions of the first image further comprises means for extracting portions of the second image that correspond to mold spores; and wherein the means for placing the extracted portions of the first image on the background further comprises means for placing extracted portions of the second image on the background of the synthetic image to create the synthetic image, wherein the synthetic image comprises image data for mold spores having the first classification and mold spores having the second classification.

* * * * *